United States Patent
Bertaia

(10) Patent No.: US 12,502,977 B2
(45) Date of Patent: Dec. 23, 2025

(54) ASSISTANCE SYSTEM FOR AN ELECTRIC PERSONAL-MOBILITY VEHICLE, AND CORRESPONDING ELECTRIC VEHICLE AND METHOD

(71) Applicant: ALBA ROBOT S.r.l., Turin (IT)

(72) Inventor: Andrea Bertaia, Turin (IT)

(73) Assignee: ALBA ROBOT S.R.L., Turin (IT)

( * ) Notice: Subject to any disclaimer, the term of this patent is extended or adjusted under 35 U.S.C. 154(b) by 236 days.

(21) Appl. No.: 18/260,586

(22) PCT Filed: Jan. 7, 2022

(86) PCT No.: PCT/IB2022/050108
§ 371 (c)(1),
(2) Date: Jul. 6, 2023

(87) PCT Pub. No.: WO2022/149091
PCT Pub. Date: Jul. 14, 2022

(65) Prior Publication Data
US 2024/0300336 A1    Sep. 12, 2024

(30) Foreign Application Priority Data

Jan. 8, 2021 (IT) .......................... 102021000000266

(51) Int. Cl.
*B60L 15/20* (2006.01)
*A61G 5/10* (2006.01)
(Continued)

(52) U.S. Cl.
CPC ................ *B60L 15/20* (2013.01); *A61G 5/10* (2013.01); *B60Q 9/00* (2013.01); *A61G 5/04* (2013.01);
(Continued)

(58) Field of Classification Search
CPC .. B60L 15/20; B60L 2200/24; B60L 2240/68; B60L 2250/12; B60L 2260/40;
(Continued)

(56) References Cited

U.S. PATENT DOCUMENTS 5,218,367 A * 6/1993 Sheffer ................. B60R 25/102
340/426.2
6,302,230 B1 * 10/2001 Kamen ................ B62D 51/002
180/218

(Continued)

OTHER PUBLICATIONS

International Search Report and Written Opinion of the ISA for PCT/IB2022/050108 mailed May 16, 2022, 13 pages.

*Primary Examiner* — Gertrude Arthur Jeanglaude
(74) *Attorney, Agent, or Firm* — Nixon & Vanderhye P.C.; Lars H. Genieser

(57) ABSTRACT

Described herein is an assistance system for an electric personal-mobility vehicle (1a) for a person with reduced mobility. The assistance system comprises sensors (50a) configured for supplying data on the current state of the electric vehicle (1a) and a processing system (60, 2, 3). During a path training step, the processing system monitors a control signal (S1; Da, Db) supplied by a user interface (10a) of the electric vehicle (1a) and drives at least one actuator (30) of the electric vehicle (1a) as a function of the control signal (S1; Da, Db). Moreover, the processing system acquires a plurality of positions of the electric vehicle (1a), processes such position data to generate data that define at least one allowed zone, and stores the at least one allowed zone in a memory (62). Instead, during a normal operating step, the processing system determines the current state of the electric vehicle (1a) as a function of the data supplied by the sensors (50a) and monitors the control signal (S1; Da, Db) supplied by the user interface (10a). On the basis of these data, the processing system estimates a future (Continued)

state of the electric vehicle (1a) and determines whether the future position of the vehicle is within at least one allowed zone stored in the memory (62). In the case where the future position is within at least one allowed zone, the processing system drives the at least one actuator (30) of the electric vehicle (1a) as a function of the control signal (S1; Da, Db). Instead, in the case where the future position is not within at least one allowed zone, the processing system may control the actuators for keeping the electric vehicle (1a) within at least one allowed zone and/or generate an alert signal.

9 Claims, 6 Drawing Sheets

(51) Int. Cl.
*B60Q 9/00* (2006.01)
*A61G 5/04* (2013.01)

(52) U.S. Cl.
CPC ....... *A61G 2203/70* (2013.01); *B60L 2200/24* (2013.01); *B60L 2240/68* (2013.01); *B60L 2250/12* (2013.01); *B60L 2260/40* (2013.01)

(58) Field of Classification Search
CPC ........ A61G 5/10; A61G 5/04; A61G 2203/70; B60Q 9/00
See application file for complete search history.

(56) References Cited

U.S. PATENT DOCUMENTS

| | | | | |
|---|---|---|---|---|
| 6,421,600 | B1* | 7/2002 | Ross | B60L 5/005 180/2.1 |
| 6,823,244 | B2* | 11/2004 | Breed | G07C 5/008 701/32.4 |
| 7,580,782 | B2* | 8/2009 | Breed | G07C 5/085 340/436 |
| 7,974,748 | B2* | 7/2011 | Goerick | G06V 20/58 701/28 |
| 8,036,788 | B2* | 10/2011 | Breed | G07C 5/0808 701/31.9 |
| 2008/0300777 | A1 | 12/2008 | Fehr et al. | |
| 2012/0136666 | A1 | 5/2012 | Corpier et al. | |
| 2020/0124430 | A1 | 4/2020 | Bradlow et al. | |

* cited by examiner

ASSISTANCE SYSTEM FOR AN ELECTRIC PERSONAL-MOBILITY VEHICLE, AND CORRESPONDING ELECTRIC VEHICLE AND METHOD

This application is the U.S. national phase of International Application No. PCT/IB2022/050108 filed Jan. 7, 2022 which designated the U.S. and claims priority to IT 102021000000266 filed Jan. 8, 2021, the entire contents of each of which are hereby incorporated by reference.

FIELD OF THE INVENTION

The present disclosure relates to solutions for assisting a user during driving of a personal-mobility vehicle, in particular an electric personal-mobility vehicle for a person with reduced mobility.

DESCRIPTION OF THE PRIOR ART

An extremely large number of types of personal-mobility vehicles (PMVs) are known. A subset of these PMVs are electric vehicles that enable a person with disabilities and/or motor difficulties, a so-called person with reduced mobility (PRM), such as a disabled or elderly person, to move more easily. For instance, this set of vehicles comprises wheelchairs with electric engines, electric wheelchairs, or electric scooters.

Typically the above PMVs comprise a seat for a user/rider and a plurality of wheels 40. Typically, the PMV comprises (at least) four wheels, but there are also known vehicles that comprise only three wheels or self-balancing electric wheelchairs that comprise only two axial wheels (similar to a hoverboard).

As shown in FIG. 1, typically such a vehicle 1 comprises a plurality of actuators 30, typically motors, which enable displacement of the vehicle 1. For instance, such actuators 30 may comprise (at least) two electric actuators 30a and 30b configured for turning, respectively, a first wheel 40a and a second wheel 40b of the vehicle 1. For instance, with reference to a wheelchair, the wheels 40a and 40b are typically the rear wheels. For instance, the actuators 30a and 30b may be motors configured for turning the shaft/hub of the respective wheel 40a or 40b. However, solutions are also known in which the actuators 30a and 30b are in contact with the rims or tyres of the wheels 40a and 40b. For instance, this second solution is frequently used in a so-called installation kit that enables conversion of a traditional wheelchair into an electric wheelchair. For instance, in this connection it is possible to cite the Mexican patent application MX2017005757, or else the so-called light-drive engine (http://progettiamoautonomia.it/prodotto/propulsione-per-carrozzina-light-drive). In this case, the directional movement of the vehicle 1 is hence obtained via a different rotation of the wheels 40a and 40b. In general, the actuators 30 may also comprise one or more motors for moving the vehicle 1 forwards or backwards and an additional auxiliary motor that enables steering of the vehicle 1.

The vehicle 1 further comprises a control circuit 20 and a user interface 10. In particular, the control circuit 20 is configured for driving the electric actuators 30 as a function of one or more control signals received from the user interface 10. For instance, the user interface 10 may comprise a joystick, a touchscreen, or another human-computer interface (HCI), such as an eye-tracker, i.e., a device for oculometry (i.e., a device for eye monitoring/tracking), or a head-tracking device, i.e., a device for monitoring the position and/or displacement of the head of a user. In particular, the user interface 10 is configured for supplying a signal that identifies a direction of movement and possibly a speed of movement. The control unit 20, hence receives the signal from the user interface 10 and converts the signal into driving signals for the electric actuators 30.

Moreover known are PMVs with autonomous driving, where the control circuit 20 has associated to it a plurality of sensors 50 that enable detection of the position of the vehicle 1 and possible obstacles. For instance, solutions of this type are described in the documents U.S. Pat. No. 10,052,246 B2 or US 2004/0006422 A1, which are incorporated herein for reference.

Consequently, on the basis of the user's motor difficulties, he or she may choose a manually driven vehicle (for example, a conventional manual wheelchair), an electric vehicle (for example, a wheelchair with electric engines, or an electric wheelchair) or a self-driving vehicle. So far self-driving PMVs have not been used very much. In fact, frequently self-driving does not represent a solution because a person with motor difficulties may even so be sufficiently autonomous to drive an electric vehicle and hence wishes to maintain control thereof. Moreover, in particular in an urban environment, self-driving frequently is unable to guarantee the necessary safety of autonomous displacement of the rider.

However, the inventor has noted that frequently a user of a PMV is not able to use the vehicle properly, for example on account of motor difficulties during interaction with the user interface 10 or simply because the user is under age, thus exposing the user and/or other persons to serious risks.

OBJECT AND SUMMARY

The object of the present disclosure is to propose solutions that will enable one or more of the problems set forth above to be overcome.

In order to achieve the above object, the subject of the invention is an assistance system for a personal-mobility vehicle having the characteristics specified in the annexed Claim 1. The invention also regards a corresponding electric vehicle and a corresponding method.

The claims form an integral part of the teaching provided herein in relation to the invention.

As has been mentioned previously, various embodiments of the present disclosure regard an assistance system for an electric personal-mobility vehicle for a person with reduced mobility.

In various embodiments, the assistance system comprises a plurality of sensors configured for supplying data on the current state of the electric vehicle and a processing system. In particular, in various embodiments, the processing system may function in two modes: a path-training step and a normal operating step.

In particular, during the path-training step the processing system receives at a first instant a command for start of training (start of path) and at a second instant a command for end of training (end of path). Between the first instant and the second instant, the processing system monitors a control signal supplied by a user interface of the electric vehicle, such as a joystick, and drives at least one actuator of the electric vehicle as a function of the control signal. For instance, typically the control signal identifies a requested direction and a requested speed. In various embodiments, the processing system acquires in the meantime a sequence of positions of the electric vehicle as a function of the data supplied by the plurality of sensors and stores the positions as path data. Consequently, during the training step, a user may drive the vehicle between the first instant and the second instant along a path, and the processing system acquires the path data.

In various embodiments, once the path data have been acquired, the processing system processes the path data to generate data that define at least one allowed zone, and stores the at least one allowed zone as list of allowed zones in a memory. For instance, in various embodiments, the processing system processes the path data, for example by means of interpolation, to generate data that identify linear stretches of the path. In this case, the data that define the at least one allowed zone may comprise:

- the data that identify linear stretches of the path, and for each linear stretch of the path a respective left-hand margin and a respective right-hand margin; or
- data that identify corridors defined by respective linear stretches of left-hand limits and right-hand limits, in which the linear stretches of left-hand limits and right-hand limits are calculated by adding, respectively, a left-hand margin and a right-hand margin to each linear stretch of the path.

In various embodiments, the left-hand margin and the right-hand margin are constant. As an alternative, the sensors may comprise at least one video camera, and the processing system may be configured for determining the left-hand margin and the right-hand margin as a function of images supplied by the video camera.

In various embodiments, during the normal operating step, the processing system determines the current state of the electric vehicle as a function of the data supplied by the plurality of sensors. For instance, the state may comprise data that identify a position of the electric vehicle, and a direction and a speed of movement of the electric vehicle. Next, the processing system monitors the control signal supplied by the user interface of the electric vehicle and estimates a future state of the electric vehicle as a function of the current state and of the control signal; i.e., the processing system estimates the movement of the electric vehicle, in particular its future positions.

Consequently, in various embodiments, the processing system determines whether the position of the future state is within at least one of the zones in the list of allowed zones stored in the memory. In the case where the future state is within at least one allowed zone, i.e., in the case where the vehicle remains within the allowed zones, the processing system drives the at least one actuator of the electric vehicle as a function of the control signal; i.e., the vehicle moves on the basis of the commands received through the user interface of the electric vehicle.

Instead, in the case where the future state is not within at least one allowed zone, the processing system may carry out different operations, for example on the basis of the characteristics of the user who is using the electric vehicle.

For instance, in various embodiments, the processing system may guarantee the fact that the user will not be able to leave the allowed zones. For instance, for this purpose, the processing system may drive the at least one actuator of the electric vehicle to reduce the speed of the electric vehicle and/or to stop the electric vehicle and/or to correct the direction of the electric vehicle in such a way as to keep the electric vehicle within at least one allowed zone.

In addition or as an alternative, the processing system may warn the user or an operator. For instance, for this purpose, the processing system may send an alert signal to the user interface and/or to a communication interface. In various embodiments, the user or operator may then deactivate the control. For instance, for this purpose, the processing system may receive from the user interface and/or from the communication interface a command for deactivating the assistance system, and drive the at least one actuator of the electric vehicle directly as a function of the control signal.

In various embodiments, an operator may also assume control of the vehicle, for example in response to the alert signal. For instance, for this purpose, the processing system may monitor a further control signal supplied by a communication interface, where the further control signal identifies a requested direction and a requested speed. Consequently, in this case, the processing system may drive the at least one actuator of the electric vehicle as a function of the further control signal.

In various embodiments, the assistance system is able to manage road crossings by means of dynamic zones. In particular, in this case, the processing system receives during the path-training step, also information that identifies at least one dynamic zone, for example a dynamic path that corresponds to a portion of the path acquired during training. In particular, a dynamic zone has associated to it a respective condition that indicates when the dynamic zone is allowed or forbidden.

Consequently, during the normal operating step, the processing system may also verify, for at least one dynamic zone (typically, the dynamic zones that are located in the vicinity of the position of the vehicle), whether the respective condition indicates the fact that the dynamic zone is allowed or forbidden. Consequently, only in the case where the dynamic zone is allowed, may the processing system add the dynamic zone temporarily to the list of allowed zones.

For instance, a dynamic zone may be allowed when a given traffic light is green. In this case, the processing system may determine the colour of the given traffic light, for example by means of image-processing operations and/or by monitoring a signal received from the traffic light, and add the dynamic zone to the list of allowed zones when the given traffic light is green.

Likewise, a dynamic zone may be allowed when a given crossing of a road is free. In this case, the processing system may determine whether there are vehicles travelling along the road in the vicinity of the given crossing and add the dynamic zone to the list of allowed zones when there are no vehicles travelling along the road.

BRIEF DESCRIPTION OF THE DRAWINGS

Embodiments of the present disclosure will now be described in detail with reference to the attached drawings, which are provided purely by way of non-limiting example and in which.

DETAILED DESCRIPTION OF EMBODIMENTS

In the ensuing description various specific details are illustrated aimed at enabling an in-depth understanding of the embodiments. The embodiments may be provided without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Moreover, particular conformations, structures, or characteristics may be combined in any adequate way in one or more embodiments.

The references used herein are provided merely for convenience and hence do not define the sphere of protection or the scope of the embodiments.

Figure 1:
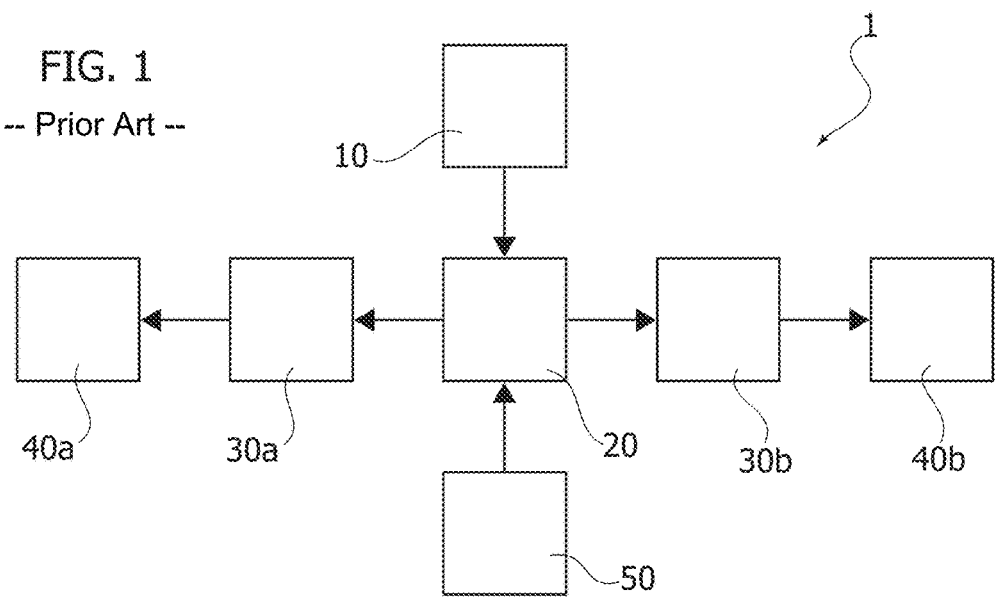
FIG. 1 shows a block diagram of an electric personal-mobility vehicle.

In the ensuing FIGS. 2 to 10, the parts, elements, or components that have already been described with reference to FIG. 1 are designated by the same references used previously in this figure; the description of these elements described previously will not be repeated hereinafter in order not to overburden the present detailed description.

As described previously, the present disclosure regards an assistance system for an electric personal-mobility vehicle for a person with reduced mobility. In various embodiments, the assistance system according to the present description does not autonomously drive the vehicle, but a user may choose a movement of the vehicle (as with a traditional electric PMV) and the system checks the choice of the user and possibly blocks movement of the vehicle.

Consequently, in various embodiments, the system according to the present description implements a system of assisted driving.

In particular, in various embodiments, the assistance system uses one or more pre-set allowed/authorised zones. For instance, as will be described in greater detail hereinafter, these zones may correspond to predefined perimeters and/or paths that are classified as allowed, for example via manual input and/or automatic learning. In various embodiments, the assistance system is hence configured for verifying in real time, via appropriate sensors, whether a command received by the user is such as to move the vehicle out of the allowed zone or zones. Moreover, in various embodiments, the assistance system may also verify in real time one or more further conditions, for example for blocking the vehicle when obstacles/persons, the edge of a sidewalk, a red traffic light, etc. are detected.

Figure 2:
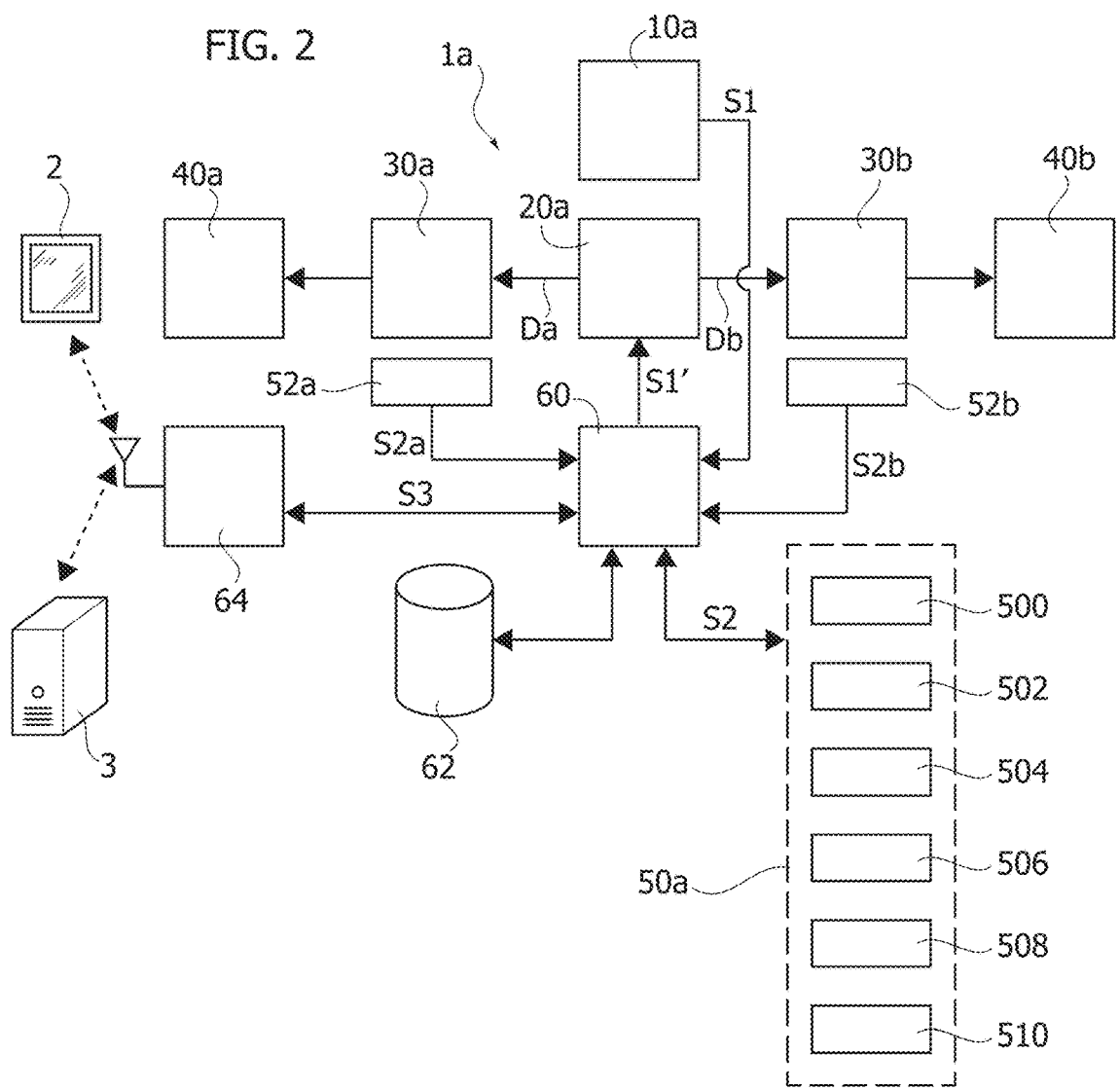
FIG. 2 shows a first embodiment of an assistance system for an electric personal-mobility vehicle.

FIG. 2 shows an embodiment of a vehicle 1a according to the present description.

In particular, in line with the description of FIG. 1, the vehicle 1a comprises:
- a plurality of actuators 30 for displacing the vehicle 1a, for example two actuators 30a and 30b for turning two wheels 40a and 40 of the vehicle 1a;
- a user interface 10a, which supplies a control signal S1 indicative of a requested direction and possibly a requested speed; and
- a control circuit 20a configured for generating driving signals D for the actuators 30, for example a driving signal Da for the actuator 30a and a driving signal Db for the actuator 30b.

For a general description of these blocks reference may be made to the description of FIG. 1. However, in the embodiment considered, the control signal S1 is not supplied directly to the control circuit 20a, but to a processing circuit 60 that is configured to supply a modified signal S1' to the control circuit; i.e., the control circuit 20a is configured to generate the driving signals D for the actuators 30 as a function of the signal S1'.

In the embodiment considered, the vehicle 1a further comprises a memory 62 and one or more sensors 50a. In particular, the memory 62 is configured for storing one or more allowed zones, and possibly data that identify maps. Instead, the sensors 50a are configured to supply data S2 that enable identification of the state of the vehicle 1a. Consequently, the processing circuit 60 is configured to acquire the data S2 and determine the state of the vehicle 1a.

Figure 4:
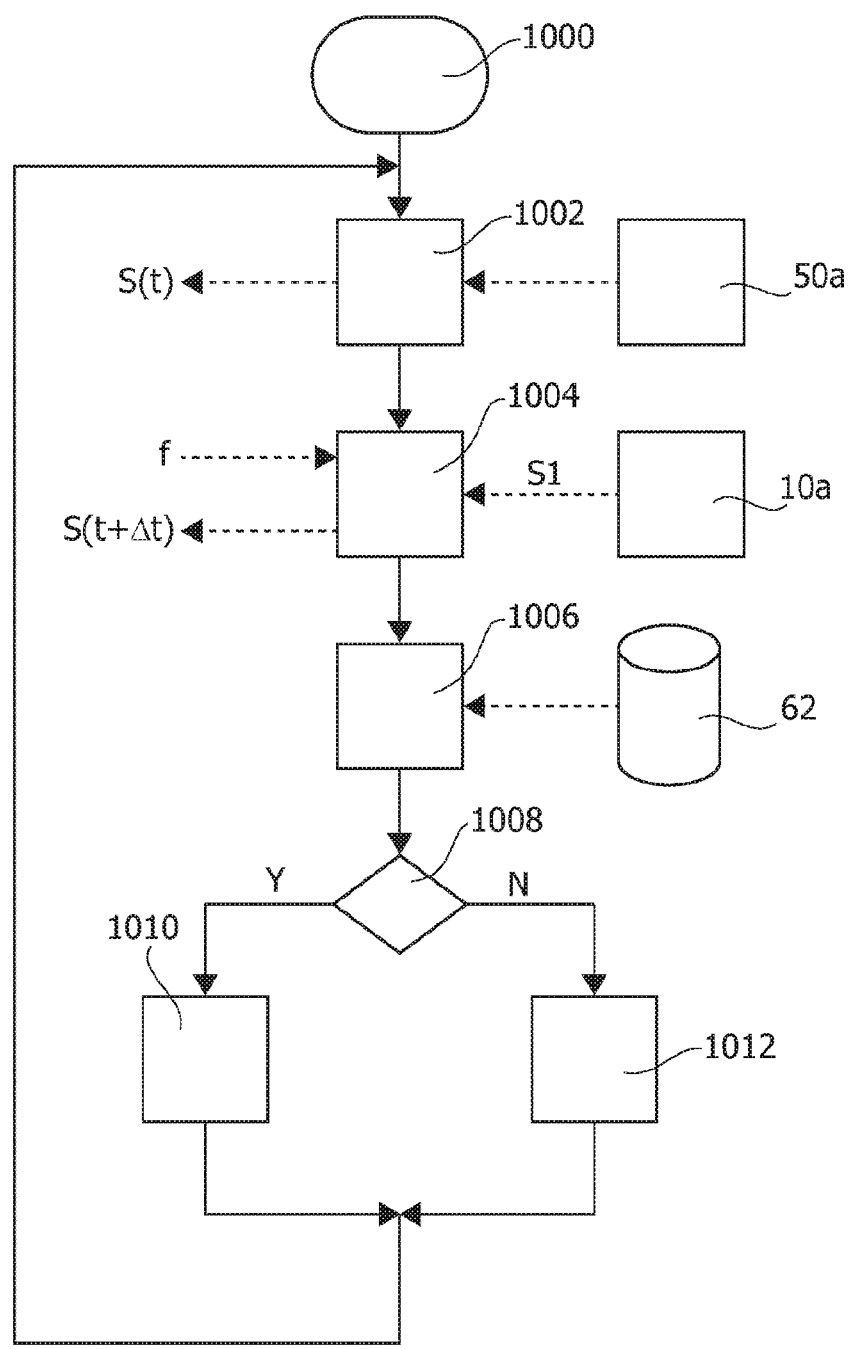
FIG. 4 shows an embodiment of the operation of the assistance system of FIG. 3 or FIG. 4.

FIG. 4 shows an embodiment of operation of the processing circuit 60. For instance, this operation may be implemented via a computer comprising a micro-processor programmable via software code, such as an embedded PC, for instance a Raspberry Pi.

After a starting step 1000, the processing circuit 60 determines the state S(t) of the vehicle 1a as a function of the data supplied by the sensors 50a. For instance, the state S(t) may be identified via a position p (for example, cartesian co-ordinates x and y, or the latitude and longitude of the vehicle), a direction/orientation φ of the vehicle 1a (for example, an angle with respect to the axis x or to the axis y, or with respect to the meridian that passes through the position of the vehicle 1a) and a speed v of the vehicle 1a. For instance, in various embodiments the state S(t) corresponds to the following vector:

$$S(t)=(p,\varphi,v)$$

The person skilled in the art will appreciate that various solutions for determining the state of a vehicle that is located outside or inside buildings are well known. For instance, the state S(t) of the vehicle 1a may be determined via satellite data and/or odometry and/or triangulation, which renders a detailed description herein superfluous.

Consequently, in various embodiments, the sensors 50a may comprise a satellite navigation receiver 502, for example a GPS, GALILEO, and/or GLONASS receiver.

As an alternative or in addition, the sensors 50a may comprise sensors that supply data that may be used for odometry, i.e., for estimation of the movement of the vehicle 1a, which is based upon information of displacement of the vehicle 1a. For instance, the sensors 50a may comprise at least one of the following:
- sensors that enable measurement of the space covered by some of the wheels 40, for example encoders 52a and 52b configured for supplying signals S2a and S2b identifying the number of rotations of the actuators 30a and 30b and/or of the wheels 40a and 40b;
- a sensor 502, for example a magnetic compass and/or an encoder, for detecting the orientation of the vehicle and/or the steering angle of the vehicle 1a;
- a triaxial accelerometer and/or gyroscope 504 configured for detecting axial and/or angular accelerations of the vehicle 1a; and
- one or more video cameras 506 configured for supplying a sequence of images that may be used for a so-called visual odometry.

In various embodiments, the sensors 50a may also comprise a wireless receiver 508 configured for determining the distance of the vehicle 1a from a plurality of mobile radio transmitters, for example as a function of the power of the mobile radio signal, which may be used for triangulation.

In various embodiments, the sensors 50a may also comprise sensors 510 for identifying possible obstacles, this enabling the processing circuit 60 to carry out a mapping. For instance, the sensors 510 may comprise a SONAR (Sound Navigation and Ranging) system including, for example, one or more ultrasonic transceivers, and/or a LIDAR (Light Detection and Ranging) system.

Consequently, the processing circuit 60 is configured to determine (or even just estimate), in step 1002, the state S(t) of the vehicle 1a. Next, the processing circuit 60 monitors the control signal S1 and calculates, in a step 1004, one or more future states of the vehicle 1a. For instance, in various embodiments, knowing the current state of the vehicle S(t), the processing circuit 60 may calculate a future state S(t+Δt) as a function of the control signal S1.

For instance, typically the signal S1 identifies a direction (typically with respect to the current orientation of the vehicle 1a) and possibly a requested speed. In general, the signal S1 may identify also other data (for example, data on inclination of the head of the user) that may be converted into direction and speed data. For instance, in various embodiments, the user interface 10a, such as a joystick, may supply a signal S1 that comprises a first value along a first axis, typically the axis x, and a second value along a second axis, typically the axis y. In this case, the control circuit 20a may be configured to convert these indicated values, in a cartesian system, into data in a system with polar co-ordinates, which hence comprise an angle and a radius, i.e., a distance. For instance, the angle may indicate a rotation of the vehicle 1a with respect to the current direction, and the radius may indicate the requested speed.

In particular, as has been mentioned previously, the control circuit 20a is configured to convert the signal S1' into a variation of the driving signals of the actuators 30, for example the signals Da and Db, for instance in order to steer the vehicle 1a and/or vary the speed of the vehicle 1a. Consequently, in various embodiments, the processing circuit 60 is configured to predict the movement of the vehicle 1a that would result from supplying the signal S1 to the control circuit 20a.

In various embodiments, the processing circuit 60 hence stores a mathematical function f that models the response of the system (made up of the control circuit 20a, the actuators 30, and the wheels 40) on the basis of the current state S(t) of the vehicle 1a and of the control signal S1; i.e., the mathematical function f supplies a future state S(t+Δt) of the vehicle 1a as a function of the current state S(t) of the vehicle 1a and of the signal S1, as follows:

$$S(t + \Delta t) = f[S(t), S1)]$$

Consequently, using the future state S(t+Δt) once again as input for the mathematical function f (instead of the current state S(t)), the processing circuit 60 is able to estimate a next future state S(t+2Δt), etc.

In various embodiments, if the control implemented in the control circuit 20a and the characteristics of the actuators 30 and of the wheels 40 are known, the function f may be determined beforehand. In other embodiments, the processing circuit 60 uses a machine-learning algorithm with automatic learning. In fact, as explained previously, the assistance system may comprise sensors 50a that enable determination of the state S(t) of the vehicle 1a. Consequently, during a learning step, the processing circuit 60 may supply the signal S1 as signal S1' to the control circuit 20a, while a user supplies different signals S1, for example by performing typical manoeuvres through the user interface 10a, which hence lead to new states S(t+Δt) of the vehicle 1a.

Consequently, having acquired a data-set that comprises a plurality of elements, in which each element comprises an initial state S(t) of the vehicle 1a, a command S1, and a respective final state S(t+Δt), the processing circuit 60 may generate the function f that models this system, hence using during learning the initial state S(t) and the command S1 as input of the machine-learning algorithm and the final state S(t+Δt) as output, and, hence, as target of learning. For instance, for this purpose, the function f may be modelled via a neural network or other machine-learning algorithms that are based upon a supervised learning.

Consequently, knowing the function f, the processing circuit 60 may estimate, in step 1004, the future state S(t+Δt) (or possibly a plurality of future states S(t+Δt), S(t+2Δt), etc.) in response to a given signal S1 supplied by the user interface 10a.

Next, the processing circuit 60 compares, in a step 1006, the future state S(t+Δt) (and possibly all the subsequent future states) with the data stored in the memory 62 that identify the allowed zone or zones.

Hence, in a step 1008, the processing circuit 60 may verify whether the future state S(t+Δt) (and possibly all the subsequent future states), in particular the respective future position p(t+Δt) of the vehicle 1a, is within at least one allowed zone.

In the case where the future state S(t+Δt) (and possibly all the subsequent future states) is within at least one allowed zone (output Y from the verification step 1008), the processing circuit 60 supplies, in a step 1010, the signal S1 as signal S1' to the control circuit 20a. Consequently, the control circuit 20a performs the required manoeuvre.

Instead, in the case where the future state S(t+Δt) (or at least one of the future states) is not within at least one allowed zone (output N from the verification step 1008), the processing circuit 60 supplies, in a step 1012, a modified signal as signal S1' to the control circuit 20a.

Consequently, in the embodiment considered, the processing circuit 60 implements a virtual user interface that emulates the signal S1 supplied by the user interface 10a. Therefore, the processing circuit 60 may also be added to existing electric PMVs, interposing the processing circuit 60 between a user interface 10a and an already existing control circuit 20a. For this purpose, the processing circuit 60 hence comprises a first interface for receiving the signal S1 from the user interface 10a and a second interface for supplying the signal S1' to the control circuit 20a.

However, in general, also different communication protocols may be used for the signals S1 and S1', for example USB and RS-232, respectively, and/or the processing system 60 may pre-process the signal S1, for example in order to calculate polar co-ordinates as a function of cartesian co-ordinates. In fact, as has been mentioned previously, it is sufficient for both of the signals S1 and S1' to be able to identify a requested direction and speed.

For instance, in various embodiments, the processing circuit 60 may be sold together with a user interface 10a, such as a joystick and/or head-tracker, and use a data protocol for the signal S1. In this case, the processing circuit 60 is hence configured to generate a signal S1' compatible with the communication protocol used by the control circuit 20a either as a function of the signal S1 or as a function of the modified signal.

For instance, in various embodiments, the modified signal S1' may correspond to a signal for reducing the speed of the vehicle 1a and/or for varying the orientation of the vehicle 1a. For example, the signal for reducing the speed of the vehicle 1a may be a stop signal, i.e., one or more commands that bring the speed of the vehicle 1a to zero. Instead, the signal for varying the orientation of the vehicle 1a may correct the orientation of the vehicle 1a in such a way as to keep the vehicle 1a within the allowed zone or zones.

As an alternative or in addition other operations may be carried out in step 1012. For instance, in various embodiments, the processing circuit 60 generates, in step 1012, an alert signal, which may be used for driving a visual and/or acoustic actuator. For instance, the alert signal may be displayed via the user interface 10a.

For example, in this case, the user interface 10a may comprise a key for activating or deactivating the assistance system. In particular, when the assistance system is deactivated, the processing circuit 60 proceeds once again to step 1010 (possibly skipping steps 1006 and 1008). Consequently, in various embodiments, following upon generation of the alert signal, the user may decide to deactivate the assistance system in such a way as to be able to leave the allowed zone. For instance, this mechanism may be used in the case of unexpected situations, such as a fire, in such a way as to guarantee safety and health of the user.

Consequently, after steps 1010 and 1012, the processing circuit 60 may return to step 1002 to monitor once again the state S(t) of the vehicle 1a.

Figure 3:
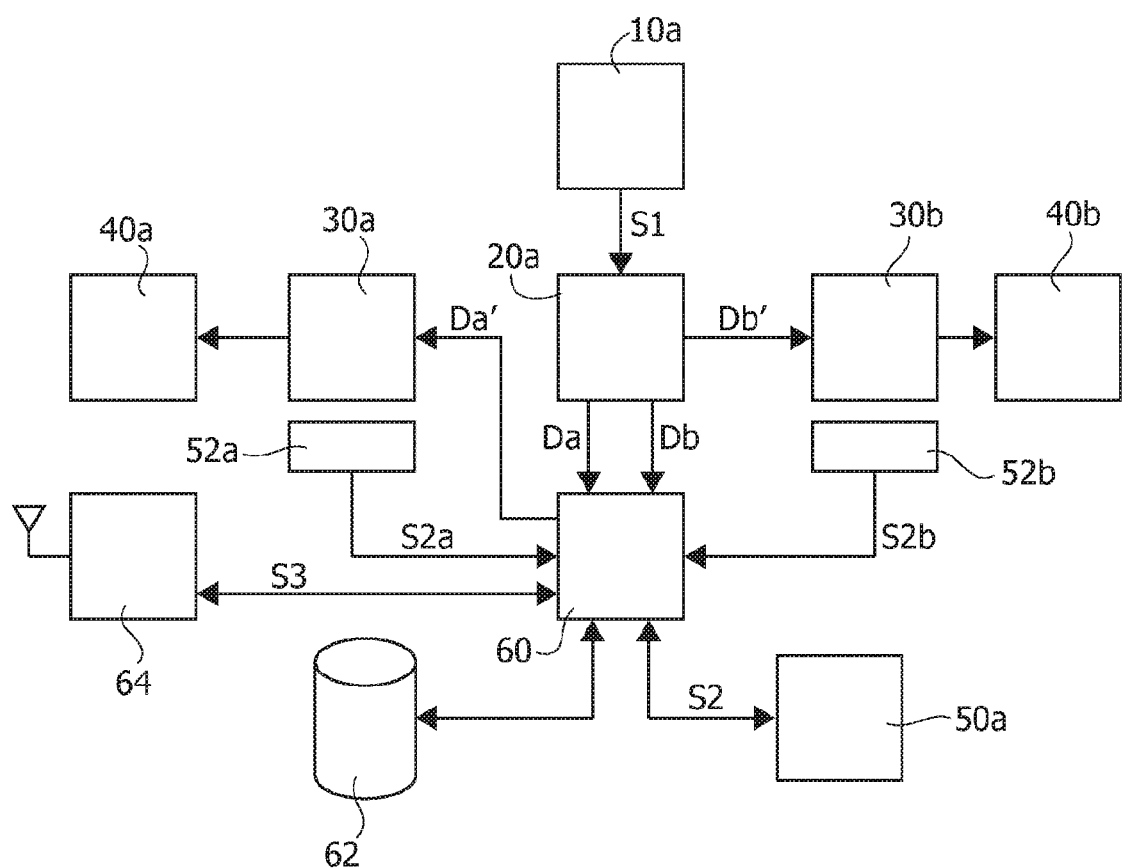
FIG. 3 shows a second embodiment of an assistance system for an electric personal-mobility vehicle.

As shown in FIG. 3, instead of receiving the signal S1 from the user interface 10 and supplying a signal S1' to the control circuit 20a, the control circuit 20a may receive also directly the signal S1 and generate the driving signals D for the actuators 30, for example the signals Da and Db for the actuators 30a and 30b. In this case, the processing circuit 60 may be configured to receive the driving signals, for example the signals Da and Db, from the control circuit 20a and supply driving signals D' to the actuators 30, for example signals Da' and Db' for the actuators 30a and 30b. Consequently, in this case, the processing circuit 60 is configured for calculating the future state S(t+Δt) as a function of the driving signals D received from the control circuit 20a, namely $$S(t + \Delta t) = f[S(t), D)]$$

Likewise, the processing circuit 60 generates, in steps 1010 and 1012, the driving signals D' for the actuators 30. In any case, the solution illustrated in FIG. 2 is advantageous since the emulation of a user interface is less complex and does not interfere with control of the actuators 30 by the control circuit 20a.

Moreover, As shown in FIGS. 2 and 3, the assistance system may also comprise a communication interface 64. For instance, the communication interface 64 may comprise at least one of the following:
an infrared transceiver;
a short-range wireless transceiver, for example a Bluetooth® transceiver;
a WiFi interface in compliance with the standard IEEE 802.11;
a transceiver for a mobile network, such as a GSM (Global System for Mobile Communications) transceiver, a CDMA (Code-Division Multiple-Access) transceiver, a W-CDMA (Wideband Code-Division Multiple-Access) transceiver, a UMTS (Universal Mobile Telecommunications System) transceiver, an HSPA (High-Speed Packet-Access) transceiver, and/or an LTE (Long-Term Evolution) transceiver; and
any other bi-directional radio-communication interface designed to transmit digital and/or analog signals.

For instance, the above communication interface 64 may be used for receiving control commands S3 from a device 2. For example, the device 2 may be any electronic device that is able to send control commands through the communication interface 64, e.g.:
an infrared remote control;
a device, for example a mobile phone or tablet, configured for sending directly data to the vehicle 1a, for example via a Bluetooth® or WiFi transceiver;
a device, for example a mobile phone, a tablet, or a remote computer, configured for sending data to the vehicle 1a through the Internet; i.e., the vehicle 1a is connected through the communication interface 64 to the Internet.

Consequently, in various embodiments, the processing circuit 60 (FIG. 2) or the control circuit 20a (FIG. 3) may use the signal S3 instead of the signal S1, which enables an operator (near the vehicle 1a or remote therefrom) to issue commands to the vehicle 1a. In particular, in the case of a remote management, the vehicle 1a sends the images acquired by at least one video camera 506 also through the communication interface 64 to the remote device 2.

The above solution is particularly advantageous in the embodiment illustrated in FIG. 2, since the processing circuit 60 is already configured for generating the signal S1' (with the protocol of the control circuit 20a) as a function of the signal S1, and may hence generate an analog signal S1' as a function of the signal S3.

Consequently, in various embodiments, a user/rider of the vehicle 1a or an operator/user of the device 2 may drive the vehicle 1a. For instance, in various embodiments, a user may drive the vehicle 1a with the assistance system activated. In the case where it is detected that the user is about to leave the allowed zone or zones, i.e., in the case where the future state S(t+Δt) (or at least one of the future states) is not within at least one allowed zone (output N from the verification step 1008), the processing circuit 60 may send, in step 1012, an alert signal to the device 2. Consequently, in this case, an operator/user of the device 2 may possibly send a command through the communication interface 64 to the processing circuit 60 in order to deactivate the assistance system, and the user of the vehicle 1a may use the user interface 10a to drive the vehicle 1a outside the allowed zones. As an alternative, the operator may directly assume control of the vehicle 1a, i.e., send the signal S3 for displacing the vehicle 1a (with the assistance system activated or deactivated).

In addition or as an alternative, the communication interface 64 may be used also for other purposes, for example for at least one of the following:
updating the software of the processing circuit 60 and/or of the control circuit 20a;
modifying one or more allowed zones in the memory 62, for example for adding one or more new zones;
controlling operation of the processing circuit 60, for example in order to start training of the function f;
monitoring operation of the processing circuit 60 and/or of the control circuit 20a; and
sharing the alert signal generated, in step 1012, by an assistance system with one or more systems of assistance of other vehicles 1a, for example vehicles that are located in the same area and/or in the same allowed zone.

As shown in FIG. 2, for this purpose, the communication interface 64 may exchange data with the device 2 and/or a remote server 3. For instance, the remote server 3 may store a plurality of allowed zones for different geographical areas, and the processing circuit 60 may be configured for downloading only the allowed zones that are located near the position of the vehicle 1a.

Consequently, in general the operation of the processing circuit 60 described previously may be implemented also via a processing system that may comprise the processing circuit 60 and possibly one or more further processing circuits, which may also be remote. Likewise, also the memory 62 may be implemented, at least in part, via a remote memory. For instance, in various embodiments, the estimations of the future state (step 1004) and/or the comparison of the future state with the allowed zones (step 1006) may be implemented in a remote processing circuit, for example the device 2 and/or the remote server 3.

As explained previously, the processing circuit 60 compares, in step 1006, the future position or positions (as identified with the future state or states S(t+Δt), S(t+2Δt), etc.) with the allowed zone or zones stored in the memory 62. In particular, in various embodiments, such zones may be:

a perimeter PE, i.e., an area within which the vehicle 1a may move without any restriction; and/or a corridor or path PA that the vehicle 1a may follow to travel from a starting point to a point of arrival.

Figure 5:
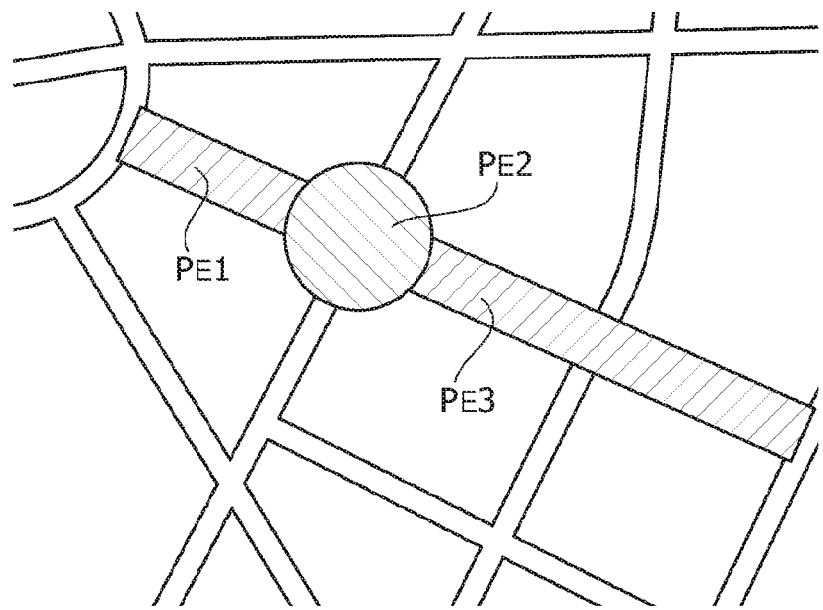
FIGS. 5, 6, 7 and 8 show details of operation of the assistance system of FIG. 3 or FIG. 4.

As shown in FIG. 5, a perimeter PE corresponds typically to an arbitrary geometrical shape, for example a rectangle (or a more complex polygon), a circle, etc. For instance, FIG. 5 shows three perimeters PE1, PE2 and PE3, which may for example delineate the perimeter of a garden.

Figure 6:
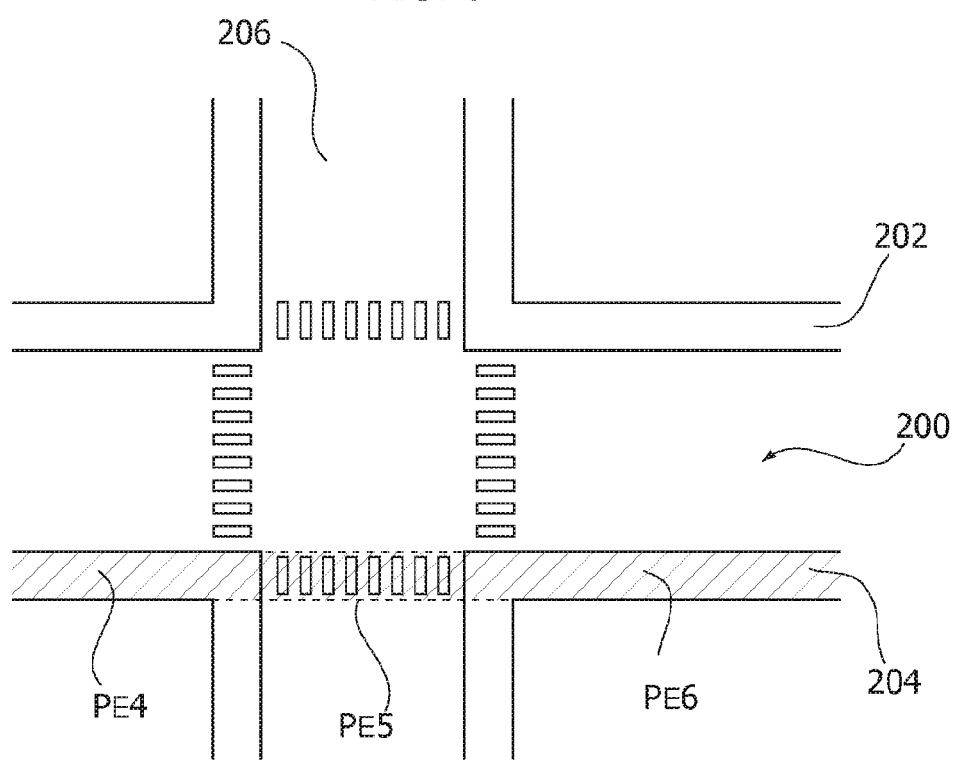

Instead, FIG. 6 shows a view from above of a road 200 that comprises two side pavements/sidewalks 202 and 204. FIG. 6 moreover shows a cross-roads with a second road 206.

Consequently, considering that just one of the pavements 202 or 204 or both of the pavements 202 or 204 could be considered allowed, whereas the road itself is considered forbidden, the memory 62 could store different perimeters PE that correspond to the area of the pavement 202 and/or the pavement 204, for example perimeters PE4 and PE6 that correspond, respectively, to the pavement 204.

As shown in FIG. 6, the pavement 204 is, however, interrupted by the road 206. Consequently, in various embodiments, it is possible to specify zones that are selectively allowed or forbidden, for example a perimeter PE5 that corresponds to the roadway 206.

For instance, in various embodiments, such "dynamic" zones correspond to cross-roads or other zones, where the vehicle 1a has to cross a road, for example the road 206. On the basis of the road conditions, these zones may be allowed or forbidden.

For instance, with reference to a cross-roads with traffic lights, the processing circuit 60 may be configured for acquiring, through one or more video cameras 506, images that show the situation around the vehicle 1a. In particular, in various embodiments, the processing circuit 60 processes these images for detecting a traffic light and then checks whether the traffic light is red or green. In addition or as an alternative, the processing circuit 60 may monitor a signal (e.g., an acoustic signal) received from the traffic light. Consequently, when the processing circuit 60 determines that the traffic light associated to the zone PE5 is green, the processing circuit 60 may identify the zone PE5 as being allowed. Instead, when the processing circuit 60 determines that the traffic light associated to the zone Z5 is red, the processing circuit 60 may identify the zone Z5 as being forbidden.

Instead, with reference to generic crossing of a road, preferably at a zebra crossing, the processing circuit 60 may be configured to determine, as a function of the images supplied by the video camera or cameras 506, whether there are vehicles travelling along the road that is to be crossed. For instance, for this purpose, the processing circuit 60 may compare a number of consecutive images, determine the differences between the images, and detect whether the differences correspond to a vehicle.

Consequently, whereas an allowed zone typically comprises only data that identify the perimeter, i.e., the allowed area, a dynamic zone preferably moreover comprises data that identify one or more conditions whereby the respective zone is allowed or forbidden. In various embodiments, such data may, for example, indicate the fact that the control circuit 60 should verify a traffic light, possibly also indicating where the traffic light is located on the roadmap and/or in the images acquired by the video camera or cameras 506.

Typically, the use of zones defined via perimeters is advantageous when a user or operator chooses, for example via the device 2 or the remote server 3, the zones using a map.

Figure 7:
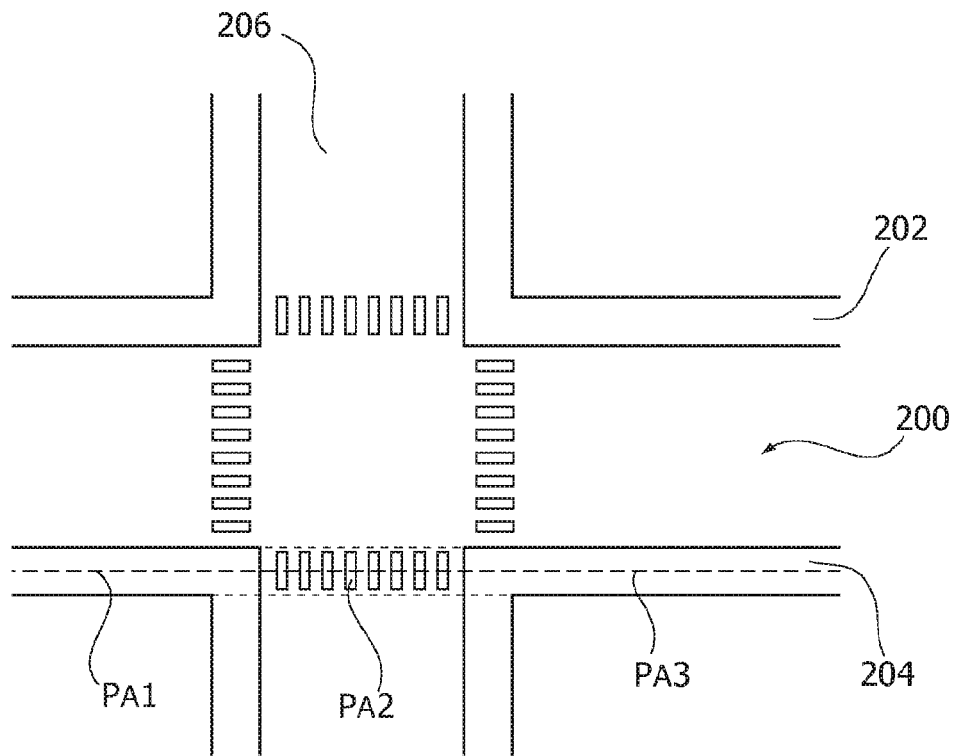

Instead, FIG. 7 shows an embodiment in which one or more zones are defined via paths PA. In particular, FIG. 7 once again shows the same road situation as that of FIG. 6. However, in this case, the pavement 204 is identified via two paths PA1 and PA3, and the area of crossing of the road 206 is identified via a dynamic path PA2. In general, operation of the dynamic path (for example, PA2) corresponds to that of a dynamic perimeter; i.e., the dynamic path may be selectively allowed or forbidden as a function of one or more conditions, for example as a function of the colour of a traffic light associated to the path P4.

For instance, the use of paths PA is advantageous when the vehicle 1a learns a path automatically during a training step. For instance, during this training step, a user (via the user interface 10a) or an operator (via the communication interface 64) may drive the vehicle 1a (without assisted control) along a path, and the processing circuit 60 may store data that identify the path itself. Preferably, for example by pressing a given key on the user interface 10a or on the remote-control application, the user or operator may signal the start and end of a dynamic path. For instance, when the user or operator signals start of a dynamic path, the user interface 10a or the remote-control application may also ask for the condition. For instance, for this purpose, the user interface 10a may display an image acquired via a video camera 506 and/or a roadmap for selecting the position of a traffic light, etc.

Consequently, in various embodiments the zones (paths PA and/or perimeters PE) may be authorized, i.e., identified as allowed, by at least one of the following:

a rider of the vehicle 1a, who may possibly share the aforesaid zones by means of the communication interface 64 (and possibly the remote server 3) with a community of other riders; for example, an independent wheelchair rider who is moving autonomously along known paths could share his own paths with riders who do not know the area and/or who are not equally independent;

assistants of the rider (for example, via a device 2), who frequently accompany a less autonomous rider along a path and know the way; and competent authorities (for example, by storing these paths in the remote server 3), who may define virtual zones deemed safe and suitable for PMVs.

Figure 8:
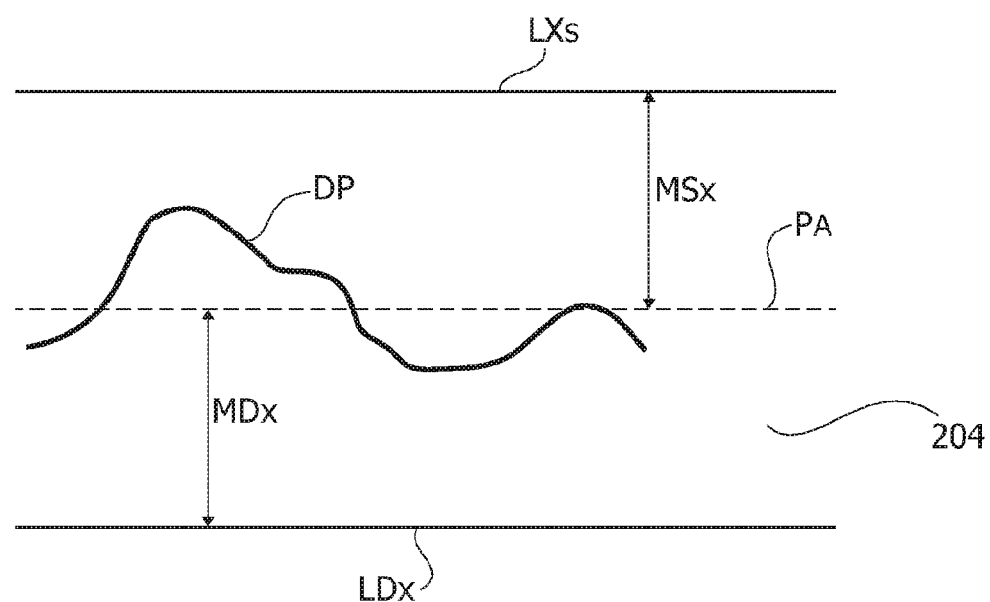

As shown in FIG. 8, a path followed by the vehicle 1*a* (whether during a training step or during assisted driving), identified, for example, via a sequence of positions referred to as path data DP, typically corresponds not to a straight line but to a variable path, for example to avoid obstacles or persons along the pavement 204.

Consequently, preferably the allowed paths (and likewise, the dynamic paths) substantially correspond to allowed zones. For instance, in various embodiments, the paths are defined by rectilinear stretches of paths, for example the path PA in FIG. 8, and for each stretch a left-hand margin MSx and a right-hand margin MDx with respect to the rectilinear path. As an alternative, as for a perimeter, a path PA may be identified via a corridor that comprises a left-hand limit LSx and a right-hand limit LDx.

Figure 9:
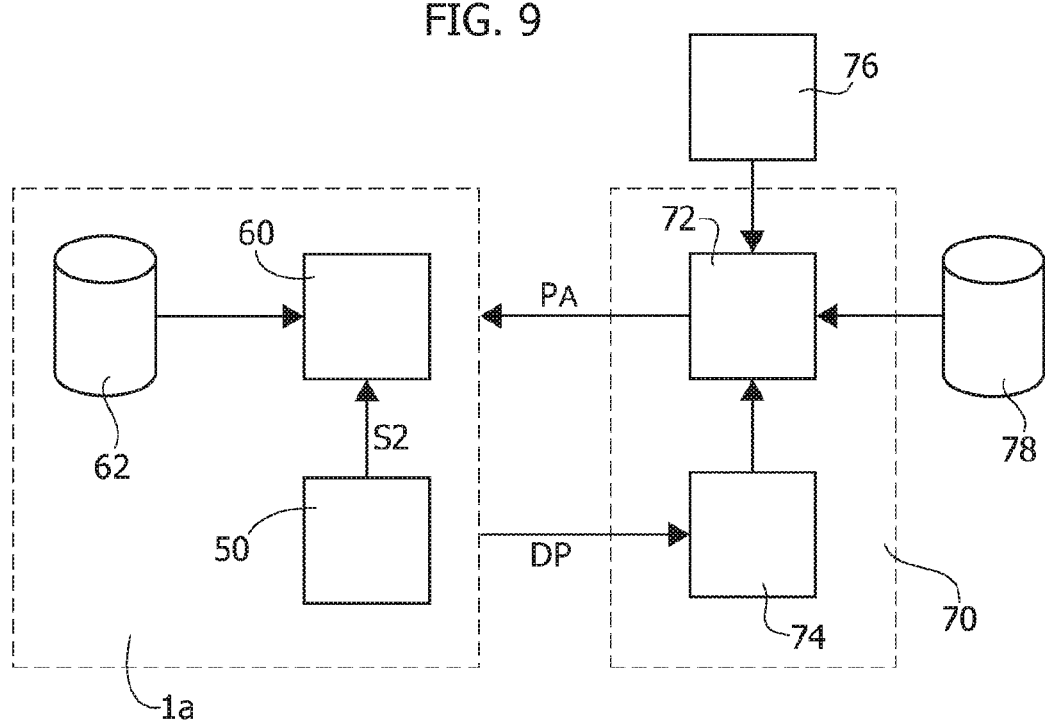
FIG. 9 shows a further embodiment of an assistance system that comprises a map-management module.

FIG. 9 shows an embodiment of a map-management module 70. Such a module 70 may be implemented, for example via software code, in the processing circuit 60, and/or in the device 2 and/or in the remote server 3. In particular, in the embodiment considered, the map-management module 70 is configured to receive, during the learning step, from the sensors 50*a* the data DP that identify the path followed by the vehicle 1*a*. For instance, such data DP may comprise a sequence of positions p that the vehicle follows.

The above data are pre-processed by a module 74 to generate one or more processed paths. In various embodiments, the module 74 supplies these pre-processed paths to a module 72 that generates the path data PA, for example identified via rectilinear stretches (identified, for instance, via an initial position and a final position) and the respective margins MSx and MDx. As shown in FIG. 9, the module 72 may use for this purpose also maps stored in a database 78. In various embodiments, the map-management module 70 may also comprise a user interface 76. For instance, in various embodiments, the above user interface 76 may be used for at least one of the following:

- adding or removing perimeters PE and/or paths PA;
- modifying the data of the perimeters PE and/or of the paths PA, for example in order to modify the margins MSx and/or MDx;
- converting allowed zones into dynamic zones, and vice versa; and
- modifying the conditions of a dynamic zone.

Figure 10:
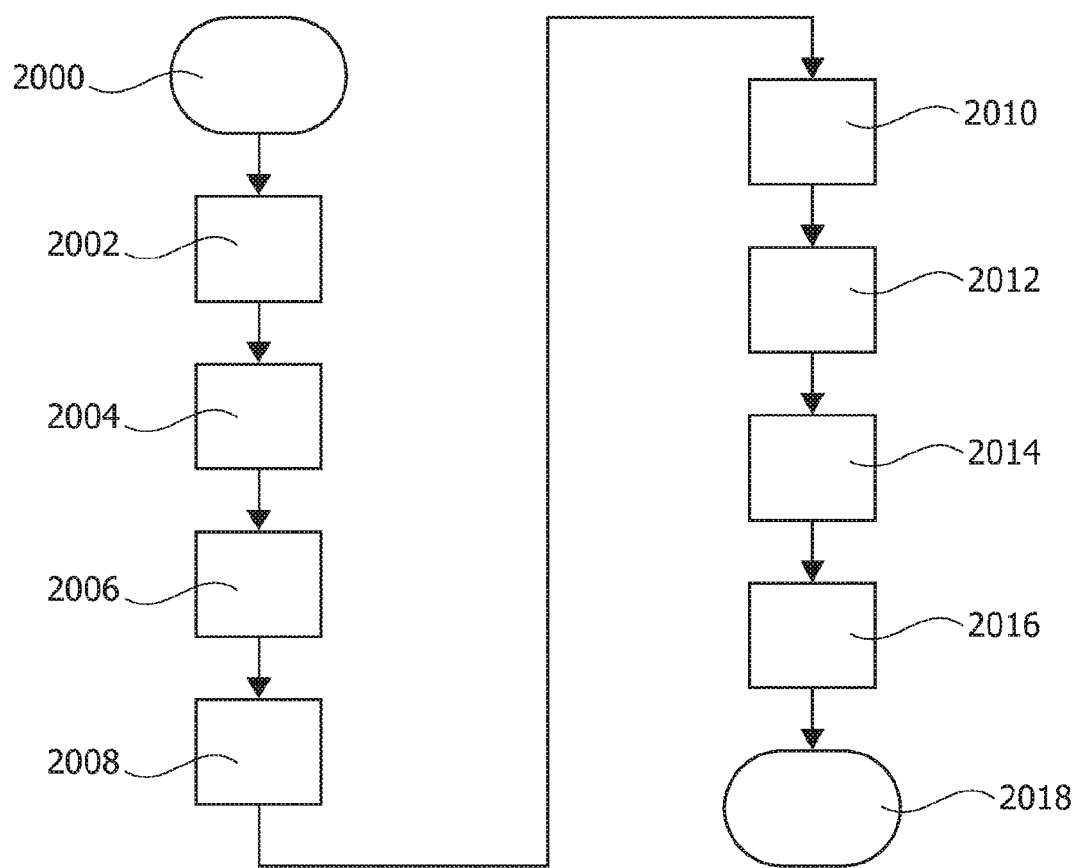
FIG. 10 shows an embodiment of operation of the assistance system of FIG. 9.

FIG. 10 shows an embodiment of a respective operation of the processing circuit 60 and of the map-management module 70. As explained previously, this operation may be implemented in any local or distributed processing system.

After a starting step 2000, the user or operator starts the training step in a step 2002, preferably also choosing a destination. In response to the start of the training step, the processing circuit preferably stores, in a step 2004, the current position of the vehicle 1*a* as starting position.

Next, the user or operator starts movement of the vehicle 1*a* in a step 2006, and the processing circuit stores the path data DP (or sends these data to the device 2 and/or the remote server 3). In various embodiments, in addition to the position data, the path data DP may also comprise other data detected by the sensors 50*a* of the vehicle 1*a*. For instance, the data may comprise images or other data that may provide indications on fixed obstacles along the path, the width of a pavement, etc.

Once the user or operator has arrived at his or her own destination, he or she terminates the training step in a step 2008. As explained, during movement, i.e., during the step 2006, the user or operator could also signal the start and end of at least one dynamic zone.

Consequently, once acquisition of the data DP is completed, the map-management module 70 may load the data DP in a step 2010.

Then, the map-management module, in particular the module 74, generates, in a step 2012, the pre-processed path. For instance, in various embodiments, the module 74 is configured for generating linear stretches of path by calculating a mean path/mean direction within a specified path interval. For example, for this purpose, the module 74 may make a linear interpolation of a given number of positions (x and y) of the vehicle 1*a* and/or of the positions in a given period of time and/or of the positions up to when the vehicle 1*a* has covered a given distance.

In various embodiments, the module 74 may be configured to join the consecutive linear stretches that have the same direction. For instance, in this way, linear stretches of a pavement may be identified, to generate, for example, a first stretch for a first part of a pavement and a second stretch when the vehicle 1*a* turns a corner of a building.

The linear stretches of the path are then supplied to the module 72, which generates, in a step 2014, the respective zones, for example identified via:
- data that identify the linear stretches of path and the respective left-hand margins MSx and right-hand margins MDx; or
- data that identify corridors defined by linear stretches of left-hand limits LSx and right-hand limits LDx.

In the simplest case, the module 72 uses a constant left-hand margin MSx and a constant right-hand margin MDx, for example chosen between 0.5 m and 1 m.

In other embodiments, the module 72 is configured for determining the left-hand margin MSx and the right-hand margin MDx for each linear stretch of path as a function of at least one between:
- the further data acquired by the sensors 50*a*, for example by the video camera or cameras 506; and
- maps of the area in which the vehicle 1*a* is moving.

For instance, in various embodiments, the module 72 is configured to determine the distance of a curb and/or a side wall as a function of the images acquired by the video camera or cameras 506, and hence automatically adapts the left-hand margin MSx and the right-hand margin MDx as a function of these data.

In addition or as an alternative, the module 72 may use the data of the map to make a match between the path acquired and the data of the map, for example in order to determine cross-roads.

As has been mentioned previously, in various embodiments, the module 72 may then calculate for each stretch a respective left-hand limit LSx and a respective right-hand limit DSx.

Consequently, the processing circuit 60 may store, in a step 2016, the stretches of path with the respective margins MSx and MDx, or the limits LSx and DSx in the memory 62, and training terminates in a step 2018.

Consequently, during normal operation, the user or operator may drive the vehicle 1*a* with control of the processing circuit 60. In particular, as has been mentioned previously, the processing system 60 may control operation of the actuators 30 (directly via the signals Da' and Db' or indirectly via the signal S1') in such a way as to guarantee that the user or operator will be unable to drive the vehicle 1*a* outside the allowed zones (perimeters PE and/or paths PA).

In general, by specifying the destination, the processing system 60 could also determine just a sub-set of zones that enable the vehicle 1a to reach the aforesaid destination (if possible). In this case, the user interface 10a or the application installed on the device 2 could also represent the path to follow in order to reach the destination, moving only within the sub-set of zones.

In general, as has been mentioned previously, the processing system 60 may implement also further checks, for example as follows:

determining possible obstacles and/or persons, for example as a function of the data supplied by the video cameras 506 and/or by the sensors 510, and possibly driving the actuators 30 for braking the vehicle 1a; and determining the curb, for example as a function of the data supplied by the video cameras 506, and possibly driving the actuators 30 for braking the vehicle 1a.

In general, the assistance system may be sold with the vehicle 1a or in the form of an installation kit. In particular, such an installation kit may comprise:

for example in the case of wheelchairs, the user interface 10a, the actuators 30, the control circuit 20a, the processing circuit 60 with the corresponding memory 62 and possibly the optional communication interface 64, and the sensors 50a; or for example in the case of a electric PMVs (which already comprise a user interface 10, actuators 30, and a control circuit 20a), only the processing circuit 60 with the corresponding memory 62 and possibly the optional communication interface 64, as well as the sensors 50a (as has been mentioned previously, in this case the user interface may be replaced or not).

Moreover, as has been mentioned previously, some functions may be implemented in the device 2 and/or in the remote server 3. Consequently, the assistance system may possibly comprise—in addition to the vehicle 1a or the respective installation kit—also the device 2 and/or a respective application to be installed on such a device 2, and/or the remote server 3.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. An assistance system for an electric vehicle for the personal mobility of a person with reduced mobility comprising:

a plurality of sensors configured to provide data on the current state of said electric vehicle;

a processing system configured to:

a) during a training phase of a path:

receive at a first instant a start command of the training and at a second instant an end command of the training, and between said first instant and said second instant:

monitor a control signal provided by a user interface of said electric vehicle, wherein said control signal identifies a requested direction and a requested velocity, and drive at least one actuator of said electric vehicle as a function of said control signal, and acquire a plurality of positions of said electric vehicle as a function of said data provided by said plurality of sensors and storing said positions as path data, process said path data to generate data which define at least one permitted zone, and store said at least one permitted zone in a memory; and b) during a normal operation phase:

determine the current state of said electric vehicle as a function of said data provided by said plurality of sensors, wherein said state comprises data which identify a position, a movement direction and a movement velocity of said electric vehicle, monitor said control signal provided by said user interface of said electric vehicle, and estimate a future state of said electric vehicle as a function of said current state and said control signal, determine whether the position of said future state is within said at least one permitted zone stored to said memory, and in case said future state is within at least one permitted zone, drive said at least one actuator of said electric vehicle as a function of said control signal, and in case said future state is not within at least one permitted zone, then drive said at least one actuator of said electric vehicle to reduce the velocity of said electric vehicle and/or for stopping said electric vehicle, and/or drive said at least one actuator of said electric vehicle to correct the direction of said electric vehicle in order to maintain said electric vehicle within at least one permitted zone, and/or send a warning signal to a communication interface, and monitor a further control signal provided by said communication interface, wherein said further control signal identifies a requested direction and a requested velocity, and drive said at least one actuator of said electric vehicle as a function of the further control signal.

2. The assistance system according to claim 1, wherein said processing said path data for generating data which define at least one permitted zone comprises processing said path data, e.g., via interpolation, for generate data which identify linear path segments, and wherein said data which define said at least one permitted zone comprise:

said data which identify linear path segments, and for each linear path segment a respective margin to the left and a respective margin to the right, or data which identify corridors composed of respective linear segments of margins to the left and of margins to the right, wherein said linear segments of margins to the left and of margins to the right are calculated by adding a margin to the left and a margin to the right, respectively, to each linear path segment.

3. The assistance system according to claim 2, wherein:

said margin to the left and said margin to the right are constant, or said plurality of sensors comprises at least one camera and said processing system is configured to determine said margin to the left and said margin to the right as a function of images provided by said at least one camera.

4. The assistance system according to claim 1, wherein said processing system is configured to:

during said training phase of said path:

receive information which identify at least one dynamic zone, wherein with each dynamic zone is associated a respective condition which indicates when the dynamic zone is permitted or prohibited; and during said normal operation phase:

verify for at least one dynamic zone whether the respective condition indicates that the dynamic zone is permitted or prohibited, and in case the dynamic zone is permitted, adding the dynamic zone to said at least one permitted zone.

5. The assistance system according to claim 4, wherein:
a first dynamic zone is permitted when a given traffic light is green, and wherein said processing system is configured, during said normal operation phase, to determine the color of said given traffic light, and add said first dynamic zone to said at least one permitted zone when said given traffic light is green, and/or
a second dynamic zone is permitted when a given road crossing is free, and wherein said processing system is configured, during said normal operation phase, to determine whether vehicles are in movement on said road near said given road crossing, and add said second dynamic zone to said at least one permitted zone when there are no vehicles in movement on said road.

6. The assistance system according to claim 1, wherein said processing system is configured, during said normal operation phase, to:
in case said future state is not within at least one permitted zone:
send a warning signal to said user interface.

7. The assistance system according to claim 6, wherein said processing system is configured, during said normal operation phase, to:
receive a command for deactivating said assistance system from said user interface and/or said communication interface, and
in response to said command for deactivating said assistance system, drive said at least one actuator of said electric vehicle as a function of said control signal.

8. An electric vehicle for the personal mobility of a person with reduced mobility, comprising:
a seat for said person with reduced mobility;
a user interface;
at least one actuator for moving said electric vehicle; and
an assistance system according to claim 1.

9. A method of controlling the operation of an electric vehicle for the personal mobility of a person with reduced mobility, comprising the steps of:
a) during a training phase of a path:
receiving at a first instant a start command of the training and at a second instant an end command of the training, and between said first instant and said second instant:
monitoring a control signal provided by a user interface of said electric vehicle, wherein said control signal identifies a requested direction and a requested velocity, and driving at least one actuator of said electric vehicle as a function of said control signal, and
acquiring a plurality of positions of said electric vehicle as a function of said data provided by said plurality of sensors and storing said positions as path data,
processing said path data to generate data which define at least one permitted zone, and
storing said at least one permitted zone in a memory; and
b) during a normal operation phase:
determining the current state of said electric vehicle as a function of said data provided by said plurality of sensors, wherein said state comprises data which identify a position, a movement direction and a movement velocity of said electric vehicle,
monitoring said control signal provided by said user interface of said electric vehicle, and estimating a future state of said electric vehicle as a function of said current state and said control signal,
determining whether the position of said future state is within said at least one permitted zone stored to said memory, and
in case said future state is within at least one permitted zone (PE, PA), driving said at least one actuator of said electric vehicle as a function of said control signal, and
in case said future state is not within at least one permitted zone, then
driving said at least one actuator of said electric vehicle to reduce the velocity of said electric vehicle and/or for stopping said electric vehicle, and/or
driving said at least one actuator of said electric vehicle to correct the direction of said electric vehicle in order to maintain said electric vehicle within at least one permitted zone; and/or
sending a warning signal to a communication interface, and monitoring a further control signal provided by said communication interface, wherein said further control signal identifies a requested direction and a requested velocity, and driving said at least one actuator of said electric vehicle as a function of the further control signal.

* * * * *